United States Patent [19]

Matsuno et al.

[11] Patent Number: 5,729,971
[45] Date of Patent: Mar. 24, 1998

[54] ENGINE CATALYST TEMPERATURE ESTIMATING DEVICE AND CATALYST DIAGNOSTIC DEVICE

[75] Inventors: Osamu Matsuno, Ebina; Hiroshi Abe, Yokosuka, both of Japan

[73] Assignee: Nissan Motor Co., Ltd., Kanagawa, Japan

[21] Appl. No.: 735,872

[22] Filed: Oct. 23, 1996

[30] Foreign Application Priority Data

Oct. 23, 1995 [JP] Japan ............................ 7-274303

[51] Int. Cl.$^6$ ............................ F01N 3/20; G01K 13/00
[52] U.S. Cl. ............................ 60/277; 60/276; 73/118.1
[58] Field of Search ............................ 60/274, 276, 277; 73/118.1

[56] References Cited

U.S. PATENT DOCUMENTS

| | | | |
|---|---|---|---|
| 5,303,168 | 4/1994 | Cullen et al. | 60/277 X |
| 5,414,994 | 5/1995 | Cullen et al. | 60/277 X |
| 5,526,643 | 6/1996 | Mukaihira et al. | 60/276 |
| 5,600,947 | 2/1997 | Cullen | 60/274 |

FOREIGN PATENT DOCUMENTS

7-26944  1/1995  Japan .

*Primary Examiner*—Tony M. Argenbright
*Attorney, Agent, or Firm*—Lowe, Price, LeBlanc & Becker

[57] ABSTRACT

The suitability of diagnosing deterioration of a catalyst which purifies engine exhaust is determined based on estimated catalyst temperature. A value depending on condensation in the catalyst, and a value corresponding to a state without condensation, are respectively set as a reference heat amount for a cold start and a hot start. A catalyst temperature during steady state running condition of the engine is also computed based on the engine running conditions. The heat amount given by the exhaust to the catalyst is computed from this catalyst temperature and the engine intake air volume. When the total heat amount given to the catalyst after engine startup is equal to or less than the reference heat amount, a catalyst temperature estimated value is set to a fixed value. In all other cases, the catalyst temperature estimated value is calculated by a first order delay equation having catalyst temperature during steady running conditions as a parameter. In this way, the catalyst temperature is estimated with high precision.

6 Claims, 6 Drawing Sheets

ENGINE CATALYST TEMPERATURE ESTIMATING DEVICE AND CATALYST DIAGNOSTIC DEVICE

FIELD OF THE INVENTION

This invention relates to a device which diagnoses the deterioration of a catalytic converter used in an automobile engine.

BACKGROUND OF THE INVENTION

The OBD (On Board Diagnosis)-II regulations drawn up by California State regarding the effect of automobiles on the environment, require that the function of an automobile exhaust gas purification catalyst be monitored.

When the catalyst temperature is low, the catalyst will not function even when it is normal, hence any determination of whether the catalyst has deteriorated must be made when the catalyst is active, i.e. when it is at a high temperature of approximately 400° C. or over. A method of estimating catalyst temperature for this purpose is disclosed in Tokkai Hei 6-307233 published in 1994 and Tokkai Hei 7-26944 published in 1995 by the Japanese Patent Office.

The temperature estimation in these applications is based on a catalyst temperature map in the steady engine running state having engine speed and engine load as parameters. Estimated values of catalyst temperature are obtained by processing values looked up from the map using a time constant depending on intake air volume.

However when the engine is given a start while the catalyst is cold, water vapor in the exhaust condenses in the catalyst casing and the exhaust pipe. Although there is some variation depending on atmospheric temperature, air-fuel ratio and gasoline composition, the catalyst temperature will not rise to 50° C. and above until all of this condensation is heated and evaporates.

When the catalyst temperature is estimated immediately after engine startup from the amount of heat in the exhaust, specific heat of the catalyst and volume (weight) of the catalyst, therefore, a very high estimate may be obtained even when the temperature is as low as 50° C., due to this condensed moisture. Consequently, the catalyst is erroneously determined to be active.

According to the prior art, the estimated value of catalyst temperature was held at approximately 50° C. until a predetermined time had elapsed from startup. Alternatively, a steady state exhaust temperature was found from a map according to engine speed and basic injection pulse width of the injector, and the total heat amount given by the exhaust to the catalyst was calculated by integrating (exhaust temperature×intake air volume). It was determined that the condensation had evaporated when this total heat amount had reached a predetermined reference heat amount.

However during a hot start when the engine restarts after it has stopped while the catalyst is hot, the catalyst is initially at a high temperature, so condensed moisture does not form. When the aforesaid estimation logic based on the assumption that there is condensed moisture, is applied to such a hot start, the catalyst temperature is unnecessarily estimated too low, so the catalyst is determined to become active far later than it actually does. Self-diagnosis of the catalyst is performed only when the catalyst is active, however when the catalyst is determined to be active too late, the vehicle will more often have stopped moving before the determination is made. This reduces the frequency of catalyst diagnosis.

SUMMARY OF THE INVENTION

It is therefore an object of this invention to determine the suitability of performing catalyst diagnosis separately for a hot start and cold start.

It is a further object of this invention to increase the precision of catalyst temperature determination during a hot start.

It is yet a further object of this invention to ensure that the time at which a catalyst is determined to become active is not later than the time at which it actually does become active.

In order to achieve the above objects, this invention provides a temperature estimating device for a catalyst which purifies exhaust of an engine. The device comprises a mechanism for determining whether the engine has been given a hot start or a cold start, a mechanism for setting a reference heat amount depending on a condensation produced in the catalyst when the engine has been given a cold start, and a reference heat amount corresponding to a state without condensation when the engine has been given a hot start, a mechanism for detecting a running condition of the engine, a mechanism for computing a catalyst temperature in a steady state engine running condition according to the detected running condition, a mechanism for detecting an intake air volume of the engine, a mechanism for integrating a heat amount given by the exhaust to the catalyst, from the catalyst temperature and engine intake air volume during the steady state engine running condition, a mechanism for setting a catalyst temperature estimated value to a preset value when the total heat amount given by the exhaust to the catalyst after engine startup is equal to or less than the reference heat amount, and a mechanism for computing the catalyst temperature estimated value from a first order delay equation having the catalyst temperature during the steady state engine running condition as a parameter, when the total heat amount is greater than the reference heat amount.

It is preferable that the determining mechanism comprises a mechanism for detecting a cooling water temperature of the engine, a mechanism for storing the cooling water temperature and the catalyst temperature estimated value when an ignition switch of the engine is turned off, a mechanism for determining whether or not a stored value of the cooling water temperature is greater than a first predetermined value, a mechanism for determining whether or not a stored value of the catalyst temperature estimated value is greater than a second predetermined value, and a mechanism for determining whether or not a difference between the stored value of cooling water temperature and the cooling water temperature during engine startup is less than a third predetermined value, and that the determining mechanism determines that the engine has been given a hot start when the stored value of cooling water temperature is greater than the first predetermined value, the stored value of the catalyst temperature estimated value is greater than the second predetermined value, and the difference between the stored value of cooling water temperature and the cooling water temperature during engine startup is less than the third predetermined value, while determining that the engine has been given a cold start in all other cases.

It is also preferable that the determining mechanism comprises a mechanism for detecting a cooling water temperature, a mechanism for storing the cooling water temperature and the catalyst temperature estimated value when the engine has stopped, a mechanism for determining whether or not a stored value of the cooling water temperature is greater than a first predetermined value, a mechanism for determining whether or not a stored value of the catalyst temperature estimated value is greater than a second predetermined value, and a mechanism for determining whether or not a difference between the stored value of cooling water temperature and the cooling water temperature during engine startup is less than a third predetermined value, and that the determining mechanism determines that the engine has been given a hot start when the stored value of cooling water temperature is greater than the first predetermined value, the stored value of the catalyst temperature estimated value is greater than the second predetermined value, and the difference between the stored value of cooling water temperature and the cooling water temperature during engine startup is less than the third predetermined value, while determining that the engine has been given a cold start in all other cases.

It is also preferable that the determining mechanism comprises a mechanism for measuring an elapsed time from when an ignition switch of the engine is turned off, and a mechanism for determining that the engine has been given a hot start when the elapsed time is equal to or less than a predetermined value, while determining that the engine has been given a cold start when the elapsed time is greater than the predetermined value.

It is also preferable that the determining mechanism comprises a mechanism for measuring an elapsed time from when the engine has stopped, and a mechanism for determining that the engine has been given a hot start when the elapsed time is equal to or less than a predetermined value, while determining that the engine has been given a cold start when the elapsed time is greater than the predetermined value.

This invention also provides a diagnosis device for a catalyst which purifies exhaust of an engine, comprising the catalyst temperature estimating device above described, and a mechanism for prohibiting the diagnosis until the catalyst temperature estimated value reaches a predetermined value.

The details as well as other features and advantages of this invention are set forth in the remainder of the specification and are shown in the accompanying drawings.

DESCRIPTION OF THE PREFERRED EMBODIMENTS

Figure 1:
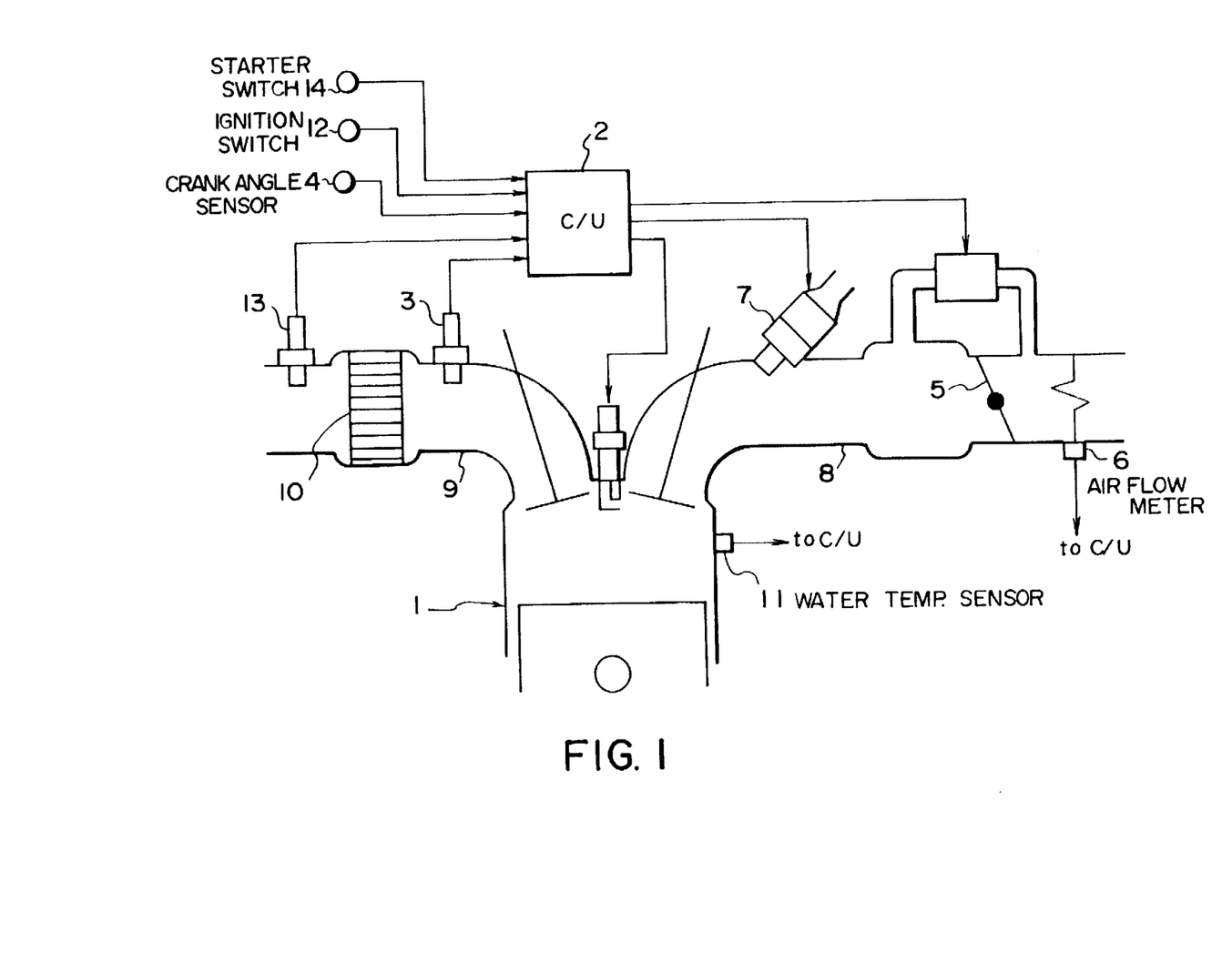
FIG. 1 is a schematic diagram of a catalyst diagnostic device according to this invention.

Referring to FIG. 1 of the drawings, an intake passage 8 of an engine 1 is provided with a throttle 5 and a fuel injector 7 downstream of the throttle.

The injector 7 injects fuel into the air in the intake passage 8 according to an injection pulse signal output by the control unit 2 (abbreviated as C/U in the figure). The control unit 2 comprises a microcomputer provided with a CPU, RAM, ROM and I/O interface.

A Ref signal (reference position signal) and a Pos signal (unit angle signal output every 1°) from a crank angle sensor 4, an intake air volume signal from an air flow meter 6 and a cooling water temperature signal from a water temperature sensor 11 are input to the control unit 2. Based on these signals, the control unit 2 outputs a basic injection pulse width Tp according to the engine speed and intake air volume at this time.

The exhaust from the engine 1 passes through a three-way catalytic converter 10 installed in the exhaust passage 9, and after toxic components in the exhaust have been converted to non-toxic components, it is discharged to the atmosphere.

An $O_2$ sensor 3 which detects oxygen concentration in the exhaust is provided in an exhaust passage 9 upstream of the converter 10. The output value from this $O_2$ sensor 3 varies according to the air-fuel ratio of the air-fuel mixture supplied to the engine 1. The control unit 2 therefore corrects the basic injection pulse width so that the air-fuel ratio periodically oscillates with a predetermined amplitude about a stoichiometric air-fuel ratio based on the signal input from the $O_2$ sensor 3, and outputs an injection pulse signal corresponding to the corrected pulse width to the injector 7. This is feedback control of the air-fuel ratio which is well known in the art.

An $O_2$ sensor 13 is also installed in the exhaust passage 9 downstream of the catalyst 10. The control unit 2 compares the output of the downstream $O_2$ sensor 13 and the output of the upstream $O_2$ sensor 3 during the aforesaid feedback control of the air-fuel ratio, and thereby determines whether or not any deterioration has occurred in the catalyst 10.

As a condition for this diagnosis, the catalyst temperature is estimated in order to determine whether or not the catalyst 10 is active.

Figure 2:
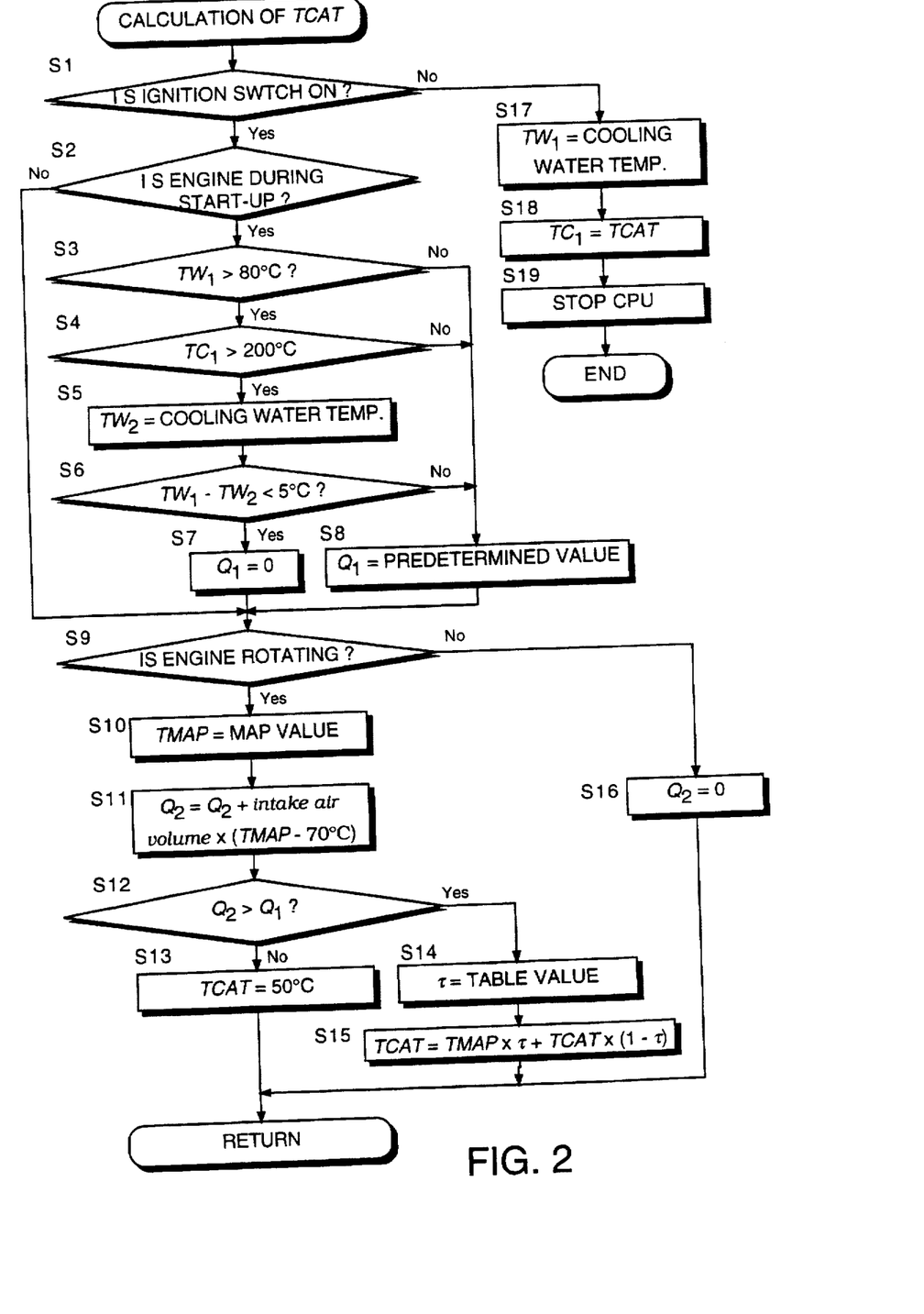
FIG. 2 is a flowchart describing a process of computing a catalyst temperature estimated value TCAT according to this invention.

The flowchart of FIG. 2 shows the process of computing the catalyst temperature estimated value TCAT. This process is performed at intervals of, for example, 1 second.

In a step S1, it is determined whether or not an ignition switch 12 is ON. For this purpose, a signal indicating ON/OFF is input from the ignition switch 12 to the control unit 2.

When the ignition switch is OFF in the step S1, the routine proceeds to a step S19, the CPU stops and this computation sequence is terminated. Steps S17 and S18 will be described hereinafter.

When the ignition switch 12 is ON, the routine proceeds to a step S2 where it is determined whether or not the engine is starting. For this purpose, a signal indicating ON/OFF is input from a starter switch 14 shown to the control unit 2, as shown in FIG. 1.

When the vehicle is starting, the routine proceeds to a step S8, and a predetermined value is input to a reference heat flowrate $Q_1$. During a cold start, water vapor in the exhaust condenses in the catalyst and exhaust pipe. $Q_1$ is the heat flowrate required to vaporize this water, and it is a fixed value. This heat flowrate differs depending on the catalyst amount and size of exhaust passage, and its value is first experimentally determined. Steps S2–S7 will be described hereinafter.

In a step S9, it is determined whether or not the engine 1 is rotating. This determination is performed by a Ref signal output by the crank angle sensor 4. When the engine 1 is rotating, the routine proceeds to a step S10, a map stored in the control unit is looked up based on the engine rotation speed and basic injection pulse width, the catalyst temperature in the steady state is calculated, and this is input to TMAP. From the value of this TMAP and the intake air volume, in a step S11, a total heat flow $Q_2$ given to the catalyst is calculated from the following equation:

$$Q_2 = Q_2 + \text{intake air volume} \times (TMAP - 70° \text{ C.})$$

Herein, 70° C. is a lower limit of a vaporization heat constant. When (TMAP−70° C.) is negative, it is set to 0. After this computation the total heat amount $Q_2$ given to the catalyst is compared with the reference heat amount $Q_1$ in a step S12.

Figure 3:
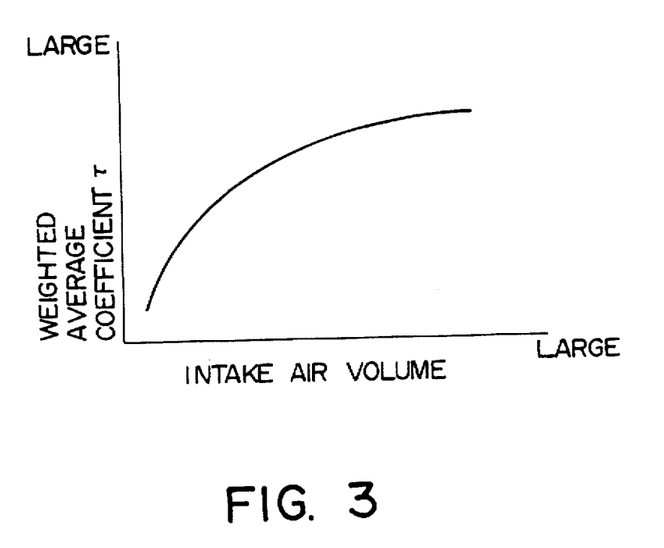
FIG. 3 is a characteristic diagram of a weighted average coefficient τ according to this invention.

Until $Q_2$ reaches $Q_1$, the exhaust heat merely vaporizes the condensation and so the catalyst temperature does not rise. Hence, when $Q_2 \leq Q_1$, the routine proceeds to a step S13 and a fixed value of 50° C. is input to the catalyst temperature estimated value. When $Q_2 > Q_1$, it is determined that all the condensation has vaporized and that the exhaust heat does increase the catalyst temperature, hence the routine proceeds to steps S14 and S15. In the step S14, a table whose contents are based on the graph of FIG. 3 is looked up from the intake air volume, and a weighted average coefficient τ is calculated. In the step S15, the catalyst temperature estimated value TCAT is calculated by the following first order delay equation having TMAP as a parameter:

$$TCAT = TMAP \times \tau + TCAT \times (1 - \tau)$$

When the engine is not rotating on the other hand, the routine proceeds from the step S9 to the step S16, 0 is input to $Q_2$, and the computation sequence is terminated.

Figure 4:
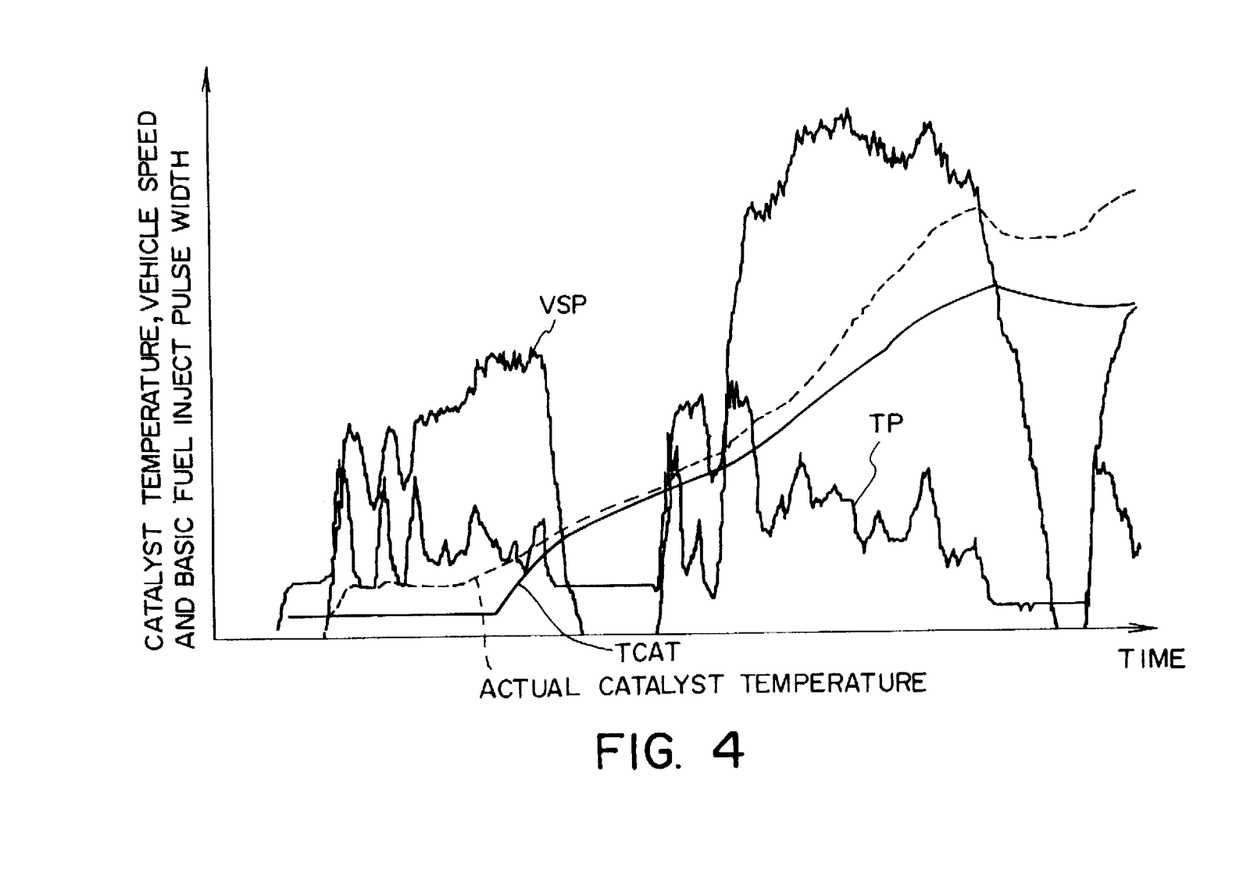
FIG. 4 is a timing chart showing the variation of a catalyst temperature estimated value in a predetermined test mode according to this invention.

FIG. 4 shows, in detail, the variation of the catalyst temperature estimated value TCAT computed in this way. This figure shows a vehicle speed VSP, basic injection pulse width Tp of the injector 7 and variation of catalyst temperature in the North American test mode (LA4).

Since the North American test mode (LA4) starts from a low temperature startup, as shown in the drawings, the catalyst temperature is a constant value until all the condensation has vaporized. It is seen that the catalyst temperature TCAT obtained in the aforesaid process corresponds well with the actual variation of catalyst temperature after complete vaporization of condensation.

After finding the catalyst temperature estimated value TCAT in this way, diagnosis of catalyst deterioration is made. Estimation of catalyst temperature is performed at short 1 second intervals as stated hereinabove, however diagnosis of catalyst deterioration may be made, for example, on each travel run of the vehicle. The diagnostic process itself is disclosed in, for example, Tokkai Sho 63-97852 published by the Japanese Patent Office in 1988 and therefore will not be discussed herein, but basically catalyst deterioration is determined by comparing the outputs of the two $O_2$ sensors 3 and 13.

Figure 5:
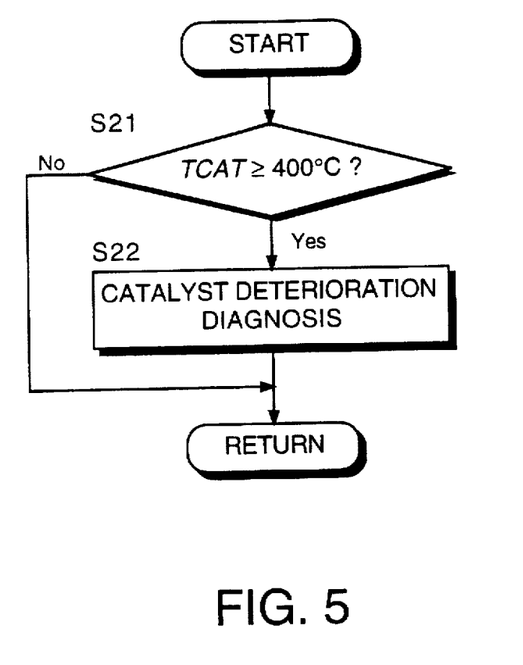
FIG. 5 is a flowchart describing a process for determining catalyst deterioration conditions using a catalyst temperature estimated value according to this invention.

In the diagnostic process, various determinations are made as whether or not certain conditions are satisfied. These determinations, as shown by a step S21 in the flowchart of FIG. 5, comprise a step wherein the catalyst temperature estimated value TCAT obtained in the aforesaid computation process is compared with a fixed value of 400° C. Diagnosis of deterioration in a step S22 is performed only when TCAT is 400° C. or higher and other conditions are satisfied.

When the catalyst has a cold start, water vapor in the exhaust condenses in the catalyst and exhaust pipe. In a hot start, the catalyst is initially at a high temperature, so condensation does not occur. This means that if, in a hot start, the catalyst temperature is estimated assuming that condensation is present, the estimate will be unnecessarily low, and the time at which the catalyst is determined to be active will be considerably later than the actual time.

Therefore according to this invention, a distinction is made between a hot start and a cold start, and a value corresponding to the state when there is no condensation is set as a reference heat amount in the case of hot start.

In FIG. 2, the steps S3–S7, step S17 and step S18 correspond to this process. Of these, the steps S3, S4, S6 determine whether the startup is a hot start or a cold start.

First, in the step S3, it is determined whether or not a cooling water temperature $TW_1$ on the immediately preceding occasion when the ignition switch was switched OFF, exceeded 80° C.

In the step S4, it is determined whether or not an estimated catalyst temperature $TC_1$ on the immediately preceding occasion when the ignition switch was switched OFF, exceeded 200° C.

In the step S6, it is determined whether or not a difference between $TW_1$ and the cooling water temperature $TW_2$ on the present startup is less than 5° C.

When these determination items are all satisfied, it is determined that the startup is a hot start, and if even one item is not satisfied, the startup is determined to be a cold start.

When a hot start has been determined, the routine proceeds to a step S7, and 0 is input to the reference heat amount $Q_1$. This is because there is no condensation during a hot start. In this case, $Q_2 > Q_1$ will always be true in the step S12, and the catalyst temperature estimated value TCAT is computed by a first order delay equation immediately after startup.

The cooling water temperature $TW_1$ and estimated catalyst temperature TCAT when the ignition switch was switched OFF on the immediately preceding occasion have been respectively input to the cooling water temperature $TW_1$ in the steps S17 and to $TC_1$ in the step S18, and these values have been stored in the RAM of the control unit 2.

According to this invention, during a cold start, the reference heat amount $Q_1$ is set to a predetermined value, whereas during a hot start it is set to 0. As a result, during a hot start wherein catalyst temperature rise begins immediately after startup, the estimation precision of the catalyst temperature is increased.

Hence during a hot start, the time at which the catalyst is determined to be active is nearer the real catalyst activation time, and catalyst deterioration diagnosis may be performed even within a limited running time.

Further, even when it is determined that the engine has stopped in the step S9, if the cooling water temperature and catalyst temperature estimated value are stored as $TW_1$, $TC_1$ as in the steps S17 and S18, the catalyst temperature may be precisely estimated even when the engine is restarted after having suddenly stopped while the vehicle is running.

Figure 6:
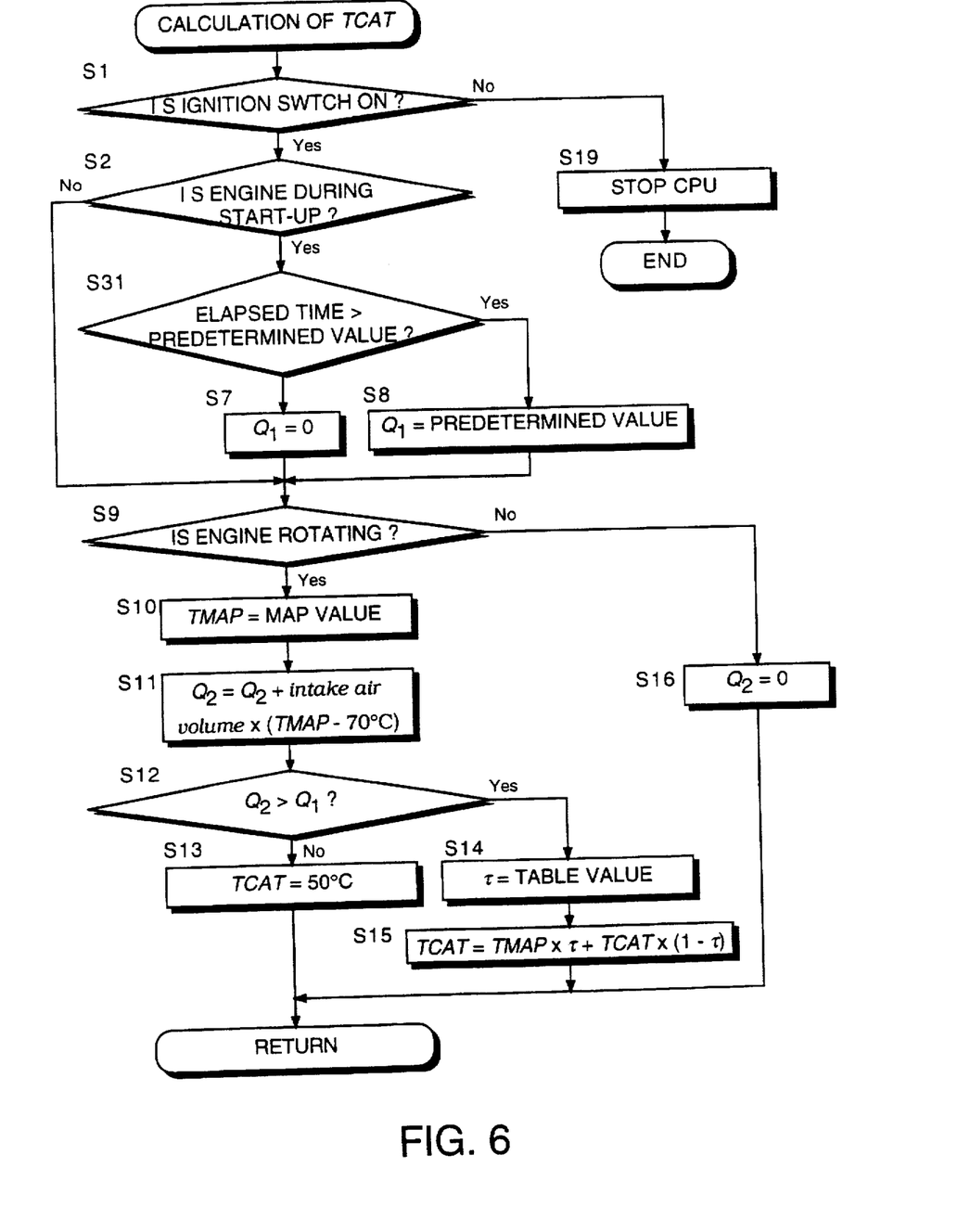
FIG. 6 is similar to FIG. 2, but showing another embodiment of this invention.

Next, another embodiment of this invention relating to the process used to compute the catalyst temperature estimated value TCAT will be described using the flowchart of FIG. 6. This figure corresponds to FIG. 2.

According to this embodiment, the determination of whether the startup is a hot start or a cold start is made by determining the elapsed time from when the Ignition switch is switched off to when it is switched on again. For this purpose, a step S31 is provided instead of the steps S3–S6 of FIG. 2.

According to the step S31, startup is determined to be a hot start when the elapsed time is equal to or less than a predetermined value, and a cold start when the elapsed time is greater than the predetermined value. As the predetermined value, the engine stopping time during which the temperature drops for 70° C. or more may be set.

The elapsed time is measured by storing the time when the ignition switch is turned off in the RAM of the control unit 2, and calculating the difference from the time when the ignition switch is turned on. Alternatively, the CPU of the control unit 2 may start counting when the ignition switch is turned off and stop counting when the ignition switch is turned on, the count value being taken as the elapsed time.

This predetermined value may also be expressed as a variable, e.g. by making it smaller the lower the external temperature.

According to this embodiment, the determination of whether startup is a hot start or a cold start is based on the elapsed time from when the ignition switch is switched off, hence steps such as the steps S17 and S18 of FIG. 2 for storing the cooling water temperature and catalyst temperature estimated value when the ignition is switched off, are unnecessary.

The embodiments of this invention in which an exclusive property or privilege is claimed are defined as follows:

1. A temperature estimating device for a catalyst which purifies exhaust of an engine, comprising:

means for determining whether said engine has been given a hot start or a cold start, means for setting a reference heat amount depending on a condensation produced in said catalyst when said engine has been given a cold start, and a reference heat amount corresponding to a state without condensation when said engine has been given a hot start, means for detecting a running condition of said engine, means for computing a catalyst temperature in a steady state engine running condition according to the detected running condition, means for detecting an intake air volume of said engine, means for integrating a heat amount given by the exhaust to the catalyst, from the catalyst temperature and engine intake air volume during the steady state engine running condition, means for setting a catalyst temperature estimated value to a preset value when the total heat amount given by the exhaust to the catalyst after engine startup is equal to or less than said reference heat amount, and means for computing said catalyst temperature estimated value from a first order delay equation having the catalyst temperature during said steady state engine running condition as a parameter, when said total heat amount is greater than said reference heat amount.

2. A catalyst temperature estimating device as defined in claim 1, wherein said determining means comprises means for detecting a cooling water temperature of said engine, means for storing said cooling water temperature and said catalyst temperature estimated value when an ignition switch of said engine is turned off, means for determining whether or not a stored value of said cooling water temperature is greater than a first predetermined value, means for determining whether or not a stored value of said catalyst temperature estimated value is greater than a second predetermined value, and means for determining whether or not a difference between said stored value of cooling water temperature and the cooling water temperature during engine startup is less than a third predetermined value, and said determining means determines that said engine has been given a hot start when said stored value of cooling water temperature is greater than said first predetermined value, said stored value of the catalyst temperature estimated value is greater than said second predetermined value, and said difference between said stored value of cooling water temperature and said cooling water temperature during engine startup is less than said third predetermined value, while determining that said engine has been given a cold start in all other cases.

3. A catalyst temperature estimating device as defined in claim 1, wherein said determining means comprises means for detecting a cooling water temperature, means for storing said cooling water temperature and said catalyst temperature estimated value when said engine has stopped, means for determining whether or not a stored value of said cooling water temperature is greater than a first predetermined value, means for determining whether or not a stored value of said catalyst temperature estimated value is greater than a second predetermined value, and means for determining whether or not a difference between said stored value of cooling water temperature and the cooling water temperature during engine startup is less than a third predetermined value, and said determining means determines that said engine has been given a hot start when said stored value of cooling water temperature is greater than said first predetermined value, said stored value of the catalyst temperature estimated value is greater than said second predetermined value, and said difference between said stored value of cooling water temperature and said cooling water temperature during engine startup is less than said third predetermined value, while determining that said engine has been given a cold start in all other cases.

4. A catalyst temperature estimating device as defined in claim 1, wherein said determining means comprises means for measuring an elapsed time from when an ignition switch of said engine is turned off, and means for determining that said engine has been given a hot start when said elapsed time is equal to or less than a predetermined value, while determining that said engine has been given a cold start when said elapsed time is greater than said predetermined value.

5. A catalyst temperature estimating device as defined in claim 1, wherein said determining means comprises means for measuring an elapsed time from when said engine has stopped, and means for determining that said engine has been given a hot start when said elapsed time is equal to or less than a predetermined value, while determining that said engine has been given a cold start when said elapsed time is greater than said predetermined value.

6. A diagnosis device for a catalyst which purifies exhaust of an engine, comprising:

a catalyst temperature estimating device as defined in claim 1, and means for prohibiting the diagnosis until said catalyst temperature estimated value reaches a predetermined value.

* * * * *